US011181166B2

(12) United States Patent
Ono

(10) Patent No.: US 11,181,166 B2
(45) Date of Patent: Nov. 23, 2021

(54) CRANK CAP ASSEMBLY

(71) Applicant: TOYOTA JIDOSHA KABUSHIKI KAISHA, Toyota (JP)

(72) Inventor: Tomoyuki Ono, Sunto-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 64 days.

(21) Appl. No.: 16/694,188

(22) Filed: Nov. 25, 2019

(65) Prior Publication Data

US 2020/0173520 A1  Jun. 4, 2020

(30) Foreign Application Priority Data

Nov. 30, 2018 (JP) .............................. JP2018-225840

(51) Int. Cl.
*F16F 15/08* (2006.01)
*F16C 9/02* (2006.01)
*F02F 7/00* (2006.01)

(52) U.S. Cl.
CPC ............ *F16F 15/08* (2013.01); *F02F 7/0053* (2013.01); *F02F 7/0065* (2013.01); *F16C 9/02* (2013.01);
(Continued)

(58) Field of Classification Search
CPC . F16C 9/02; F02F 7/0053; F16F 15/04; F16F 15/043; F16F 15/08; F16F 15/085; F16F 15/1435; F16F 15/1442
See application file for complete search history.

(56) References Cited

U.S. PATENT DOCUMENTS 1,925,072 A * 8/1933 Griswold ............ F16F 15/1442
74/574.2
2,764,038 A * 9/1956 Peirce ................. F16F 15/1442
74/574.4
(Continued)

FOREIGN PATENT DOCUMENTS

DE            1123511 B  *  2/1962 .......... F16F 15/1442
DE     10 2015 216 614 A1      3/2017
(Continued)

OTHER PUBLICATIONS

Otsuka, Masaya, "How to minimize diesel combustion noise by improving engine structure," Preprints of JSAE Lecture Series, Society of Automotive Engineers of Japan, May 18, 2005, Nos. 36-05, pp. 7-10.

*Primary Examiner* — Michael A Kessler
(74) *Attorney, Agent, or Firm* — Finnegan, Henderson, Farabow, Garrett & Dunner, LLP

(57) ABSTRACT

A crank cap assembly including a single crank cap rotatably supporting a crankshaft includes: a fastening member fastened to the crank cap, a mass member; and an elastic rubber member elastically attaching the mass member to the crank cap. The elastic rubber member includes a first rubber part arranged between the fastening member and the mass member and a second rubber part arranged between the crank cap and the mass member. The first rubber part and the second rubber part are arranged to be aligned in the mounting direction when attaching the crank cap to an engine body, and the elastic rubber member is formed so that a length in the mounting direction is longer than a maximum length in a cross-section of the elastic rubber member perpendicular to the mounting direction.

15 Claims, 14 Drawing Sheets

(52) U.S. Cl.
CPC . *F16F 2224/025* (2013.01); *F16F 2230/0029* (2013.01)

(56) References Cited

U.S. PATENT DOCUMENTS

| | | | | |
|---|---|---|---|---|
| 2,961,894 | A * | 11/1960 | Oles | F16F 15/1442 |
| | | | | 74/574.4 |
| 3,428,372 | A * | 2/1969 | Keller | F16C 27/00 |
| | | | | 384/536 |
| 4,362,341 | A * | 12/1982 | Matsumoto | F02F 7/0053 |
| | | | | 384/220 |
| 4,840,083 | A * | 6/1989 | Hagan | F16C 11/103 |
| | | | | 188/378 |
| 2005/0109306 | A1* | 5/2005 | Takahashi | F16C 35/06 |
| | | | | 123/195 R |
| 2016/0298718 | A1 | 10/2016 | Kanda et al. | |
| 2019/0186594 | A1* | 6/2019 | Ono | F02F 7/0053 |
| 2021/0010561 | A1* | 1/2021 | Kanamaru | F16B 5/0241 |

FOREIGN PATENT DOCUMENTS

| | | | |
|---|---|---|---|
| JP | 59059525 U | * | 4/1984 |
| JP | 59156147 U | * | 10/1984 |
| JP | 3139125 | | 2/2001 |
| JP | 2005-048936 A | | 2/2005 |
| WO | WO 2016/051648 | | 4/2016 |

\* cited by examiner

CRANK CAP ASSEMBLY

FIELD

The present disclosure relates to a crank cap assembly.

BACKGROUND

In general, in an internal combustion engine, it is known that combustion noise is generated by resonance occurring, based on the structure of the internal combustion engine (for example, NPL 1). For this reason, it has been proposed to provide a mechanism suppressing vibration in an internal combustion engine to reduce combustion noise accompanying such resonance (for example, PTLs 1 and 2).

In PTL 1, it has been proposed to provide a connecting rod cap damper at a connecting rod cap. A connecting rod cap damper is configured to have fastening parts respectively fastened by bolts to both ends of the connecting rod cap, a supporting part extending between these fastening parts, and a mass part connected to the center of the supporting part. The supporting part is comprised of an arc-shaped thin plate following along an outer edge of the connecting rod cap, and therefore the supporting part can elastically deform in the longitudinal direction of the connecting rod. As a result, resonance of the connecting rod in the longitudinal direction can be suppressed.

CITATIONS LIST

Patent Literature

[PTL 1] WO 2016/051648 A
[PTL 2] Japanese Patent No. 3139125 B

Nonpatent Literature

[NPL 1] Masaya Otsuka, "How to minimize diesel combustion noise by improving engine structure", Preprints of JSAE Lecture Series, Society of Automotive Engineers of Japan, May 18, 2005, Nos. 36-05, pp. 7 to 10

SUMMARY

Technical Problem

In this regard, vibration also is generated at a crank cap rotatably supporting a crankshaft. The vibration in such a crank cap includes rocking vibration by which the crank cap rocks in the front-back direction of the internal combustion engine and front-back bending vibration by which the center part of the crank cap bends in the front-back direction of the internal combustion engine.

The connecting rod cap damper described in PTL 1 is for suppressing resonance of the connecting rod in the longitudinal direction and does not necessarily suppress vibration in the front-back direction. Therefore, even if using such a connecting rod cap damper at a crank cap, it is at least not possible to sufficiently suppress vibration of the crank cap in the front-back direction.

In consideration of the above problem, an object of the present disclosure is to provide a crank cap assembly enabling vibration in the front-back direction occurring at a crank cap to be suppressed.

Solution to Problem

The present invention was devised so as to overcome the above problem and has as its gist the following.

(1) A crank cap assembly comprising a single crank cap rotatably supporting a crankshaft, wherein
the crank cap assembly comprises a fastening member fastened to the crank cap, a mass member, and an elastic rubber member elastically attaching the mass member to the crank cap,
the elastic rubber member includes a first rubber part arranged between the fastening member and the mass member and a second rubber part arranged between the crank cap and the mass member,
the first rubber part and the second rubber part are arranged to be aligned in the mounting direction when attaching the crank cap to an engine body, and
the elastic rubber member is formed so that a length in the mounting direction is longer than a maximum length in a cross-section of the elastic rubber member perpendicular to the mounting direction.

(2) The crank cap assembly according to above (1), wherein
the elastic rubber member is formed as an integral member in which the first rubber part and the second rubber part are connected by a connecting part, and includes a circumferential groove extending at least partially in the circumferential direction at the connecting part, and
the mass member is configured to include a plate shaped part fit in the circumferential groove.

(3) The crank cap assembly according to above (2), wherein
the mass member further includes a weight provided at the circumference of the plate shaped part, and
the connecting part has two parallel side surfaces extending in parallel and the plate shaped part of the mass member includes an opening of a shape complementary with the parallel side surfaces of the connecting part.

(4) The crank cap assembly according to any one of above (1) to (3), wherein
the crank cap assembly includes two elastic rubber members, and
the elastic rubber members are arranged at positions at equal intervals from the center of the crank cap to the two sides in the direction of extension of the cap, which is perpendicular to the axial direction of the crankshaft and the mounting direction.

(5) The crank cap assembly according to above (4), wherein
the fastening member includes a single mounting part attached to the crank cap and two supporting parts respectively supporting single first rubber parts, and
the mounting part is arranged at the middle of the two supporting parts in the direction of extension of the cap.

(6) The crank cap assembly according to any one of above (1) to (3), wherein
the crank cap assembly includes one elastic rubber member, and
the elastic rubber member is arranged at the center of the crank cap in the direction of extension of the cap, which is perpendicular to the axial direction of the crankshaft and the mounting direction.

(7) The crank cap assembly according to any one of above (1) to (6), wherein in the elastic rubber member, at least one of the first rubber part or the second rubber part includes a groove extending in the mounting direction or in the direction perpendicular to the mounting direction, on the side surface thereof.

(8) The crank cap assembly according to any one of above (1) to (7), wherein the elastic rubber member is arranged so that at least one of the first rubber part or the second rubber part contacts the mass member on at least part of the side surface of the first rubber part or the second rubber part.

(9) The crank cap assembly according to above (8), wherein the fastening member is formed so as to contact a side surface of the first rubber part at the opposite side to the side surface of the first rubber part contacting the mass member.

(10) The crank cap assembly according to any one of above (1) to (9), wherein at least one of the first rubber part and the second rubber part is formed at least partially in a tubular shape.

(11) The crank cap assembly according to any one of above (1) to (10), wherein the first rubber part and the second rubber part are formed so that the cross-sectional shapes perpendicular to the mounting direction are four-fold asymmetrical shapes.

(12) The crank cap assembly according to any one of above (1) to (11), wherein the fastening member includes at its surface a fitting groove having a complementary shape with the cross-sectional shape of the first rubber part, and the first rubber part is attached to the fastening member so as to fit in the fitting groove provided at the fastening member.

(13) The crank cap assembly according to any one of above (1) to (12), wherein the crank cap includes at its surface a fitting groove having a complementary shape with the cross-sectional shape of the second rubber part, and the second rubber part is attached to the crank cap so as to fit in the fitting groove provided at the crank cap.

(14) The crank cap assembly according to any one of above (1) to (13), wherein the fastening member includes a mounting part attached to the crank cap and a supporting part contacting the first rubber part and supporting the first rubber part, and the fastening member is formed so that the supporting part is positioned away from the crank cap in the mounting direction compared with the mounting part.

(15) The crank cap assembly according to any one of above (1) to (14), wherein the mass member includes a plate shaped part including a part arranged between the first rubber part and the second rubber part, and a weight provided around the plate shaped part, and the weight is connected with the plate-shaped part so as to extend in a direction away from the crank cap in the mounting direction from the plate shaped part.

Advantageous Effects of Invention

According to the present disclosure, a crank cap assembly enabling vibration in the front-back direction occurring at a crank cap to be suppressed is provided.

DESCRIPTION OF EMBODIMENTS

Figure 1:
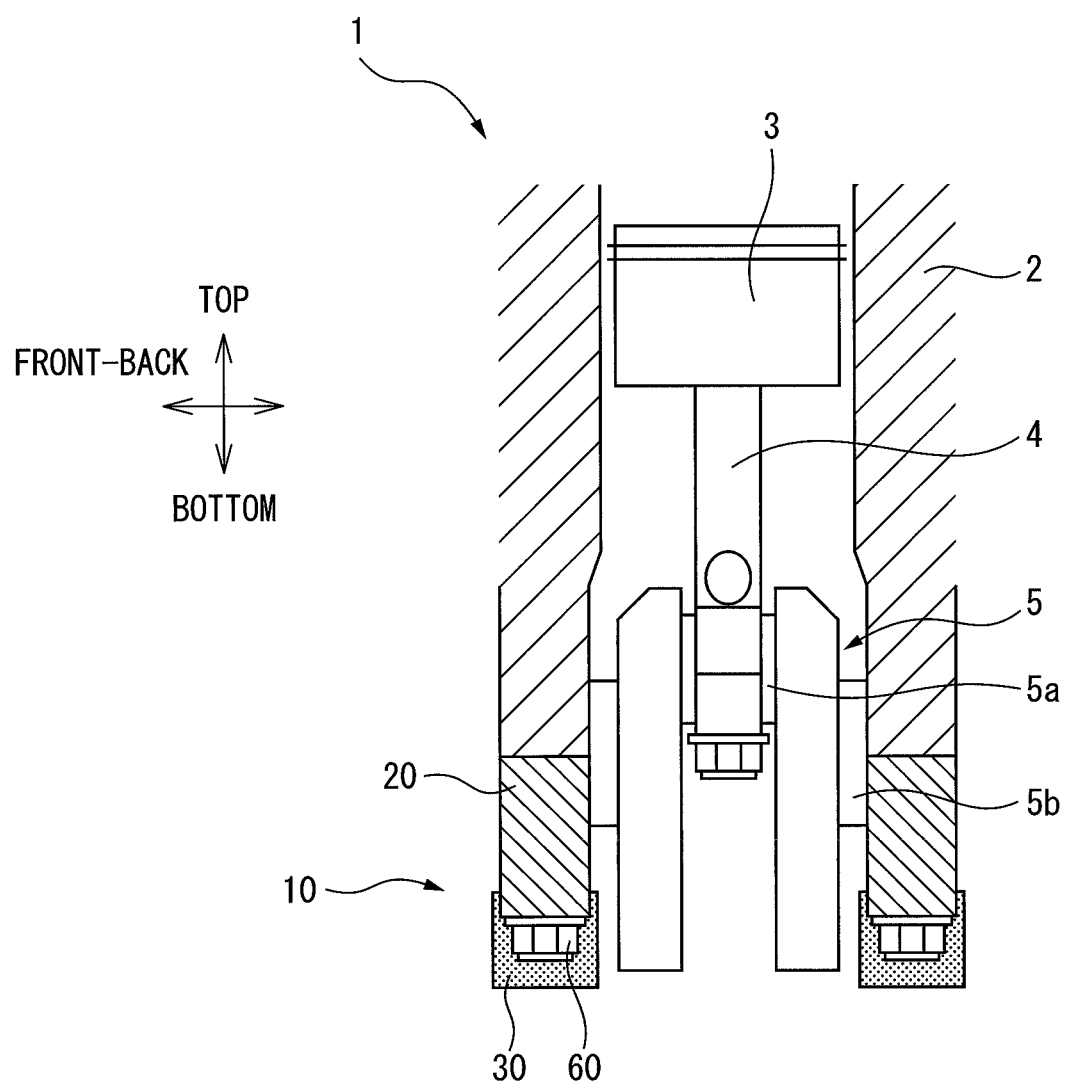
FIG. 1 is a schematic side cross-sectional view of an internal combustion engine provided with a crank cap assembly.

Referring to the drawings, embodiments will be explained in detail below. Note that in the following explanation, similar components are assigned the same reference signs.

First Embodiment

FIG. 1 is a schematic side cross-sectional view of an internal combustion engine for automobile provided with a crank cap assembly according to the present embodiment. As shown in FIG. 1, the internal combustion engine 1 is provided with a cylinder block 2, a piston 3, a connecting rod 4, a crankshaft 5, and a crank cap assembly 10. The piston 3 reciprocates upwardly and downwardly in a cylinder formed in the cylinder block 2. The connecting rod 4 is connected at a first end to the piston 3 by a piston pin (not shown), and is connected at the other end to the crankshaft 5 by a crank pin 5a. The connecting rod 4 acts so as to convert the reciprocating motion of the piston 3 to rotational motion of the crankshaft 5.

Further, the crankshaft 5 is provided with a plurality of crank journals 5b. The crank journals are supported rotatably by bearings. The bearings are formed by semicircular shaped recesses formed at the bottom parts of the cylinder block 2 and semicircular shaped recesses formed at the crank cap assembly 10 (later mentioned recesses 21). More particularly, the bearings are comprised of semicylindrical shaped journal bearings provided on the recesses of the cylinder block 2 and semicylindrical shaped journal bearings formed at the crank cap assembly 10.

<<Configuration of Crank Cap Assembly>>

Figure 2:
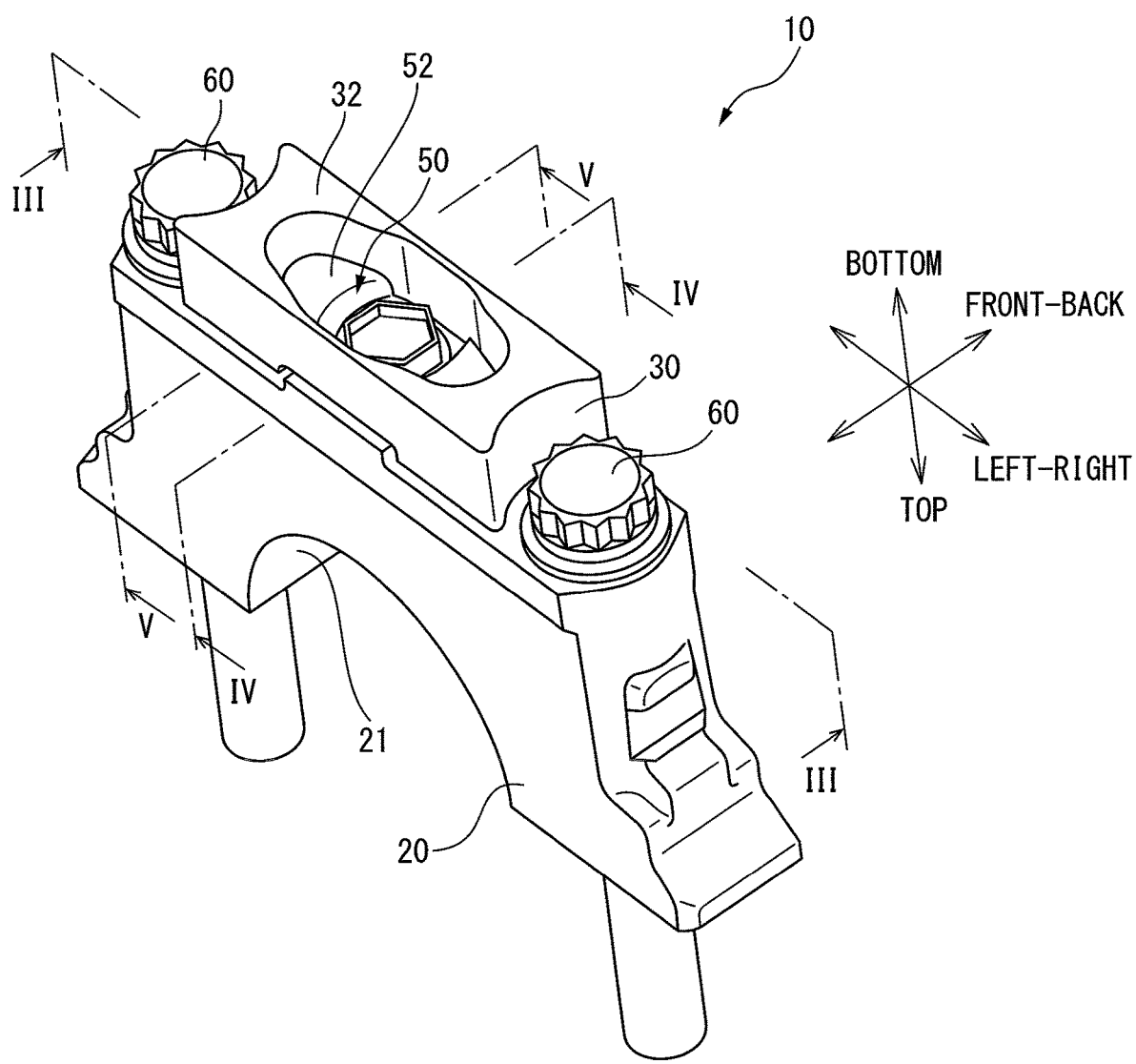
FIG. 2 is a perspective view schematically showing a crank cap assembly in the assembled state.
Figure 3:
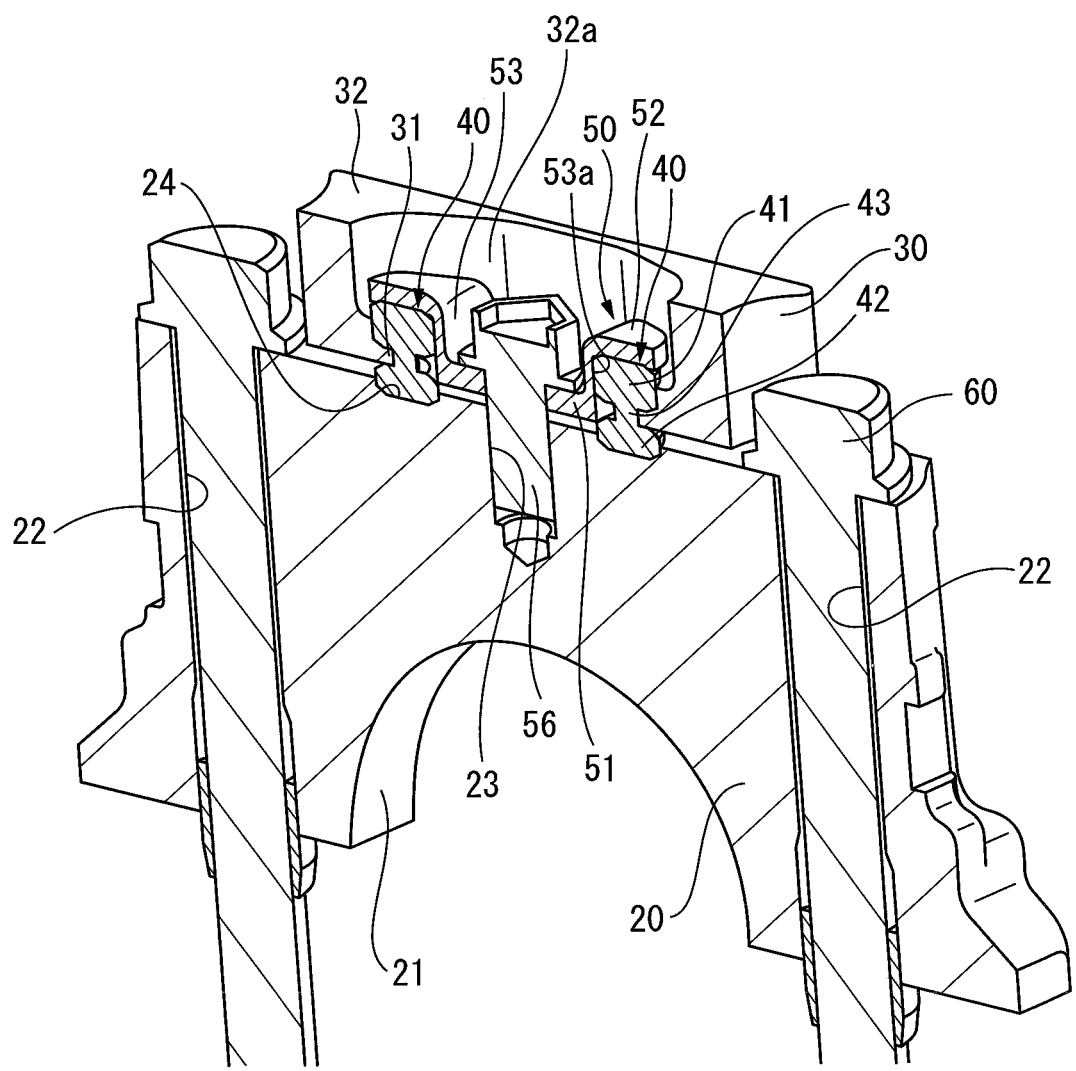
FIG. 3 is a cross-sectional perspective view of a crank cap assembly seen along a line of FIG. 2.
Figure 3:
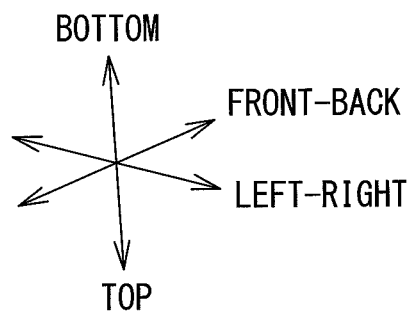
Figure 4:
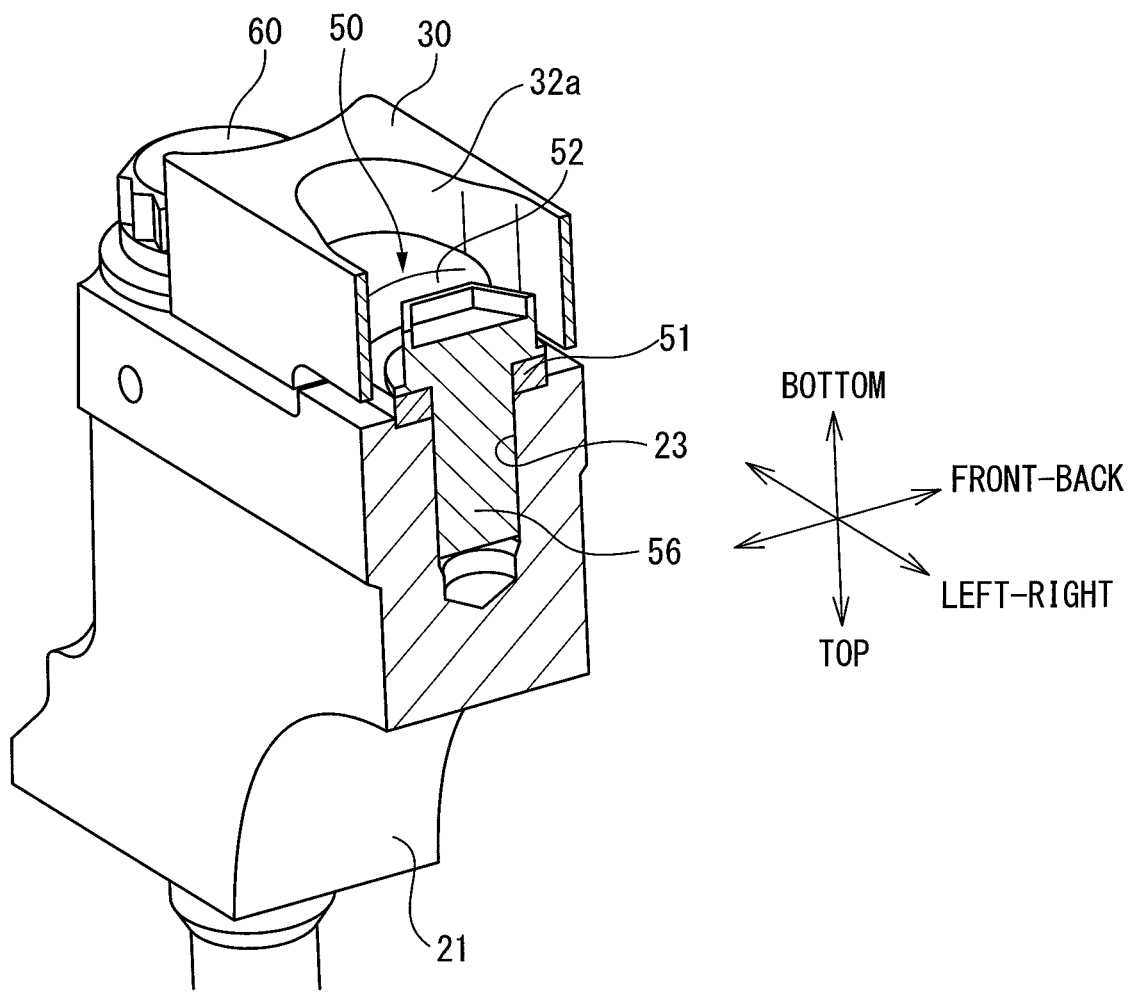
FIG. 4 is a cross-sectional perspective view of a crank cap assembly seen along a line IV-IV of FIG. 2.
Figure 5:
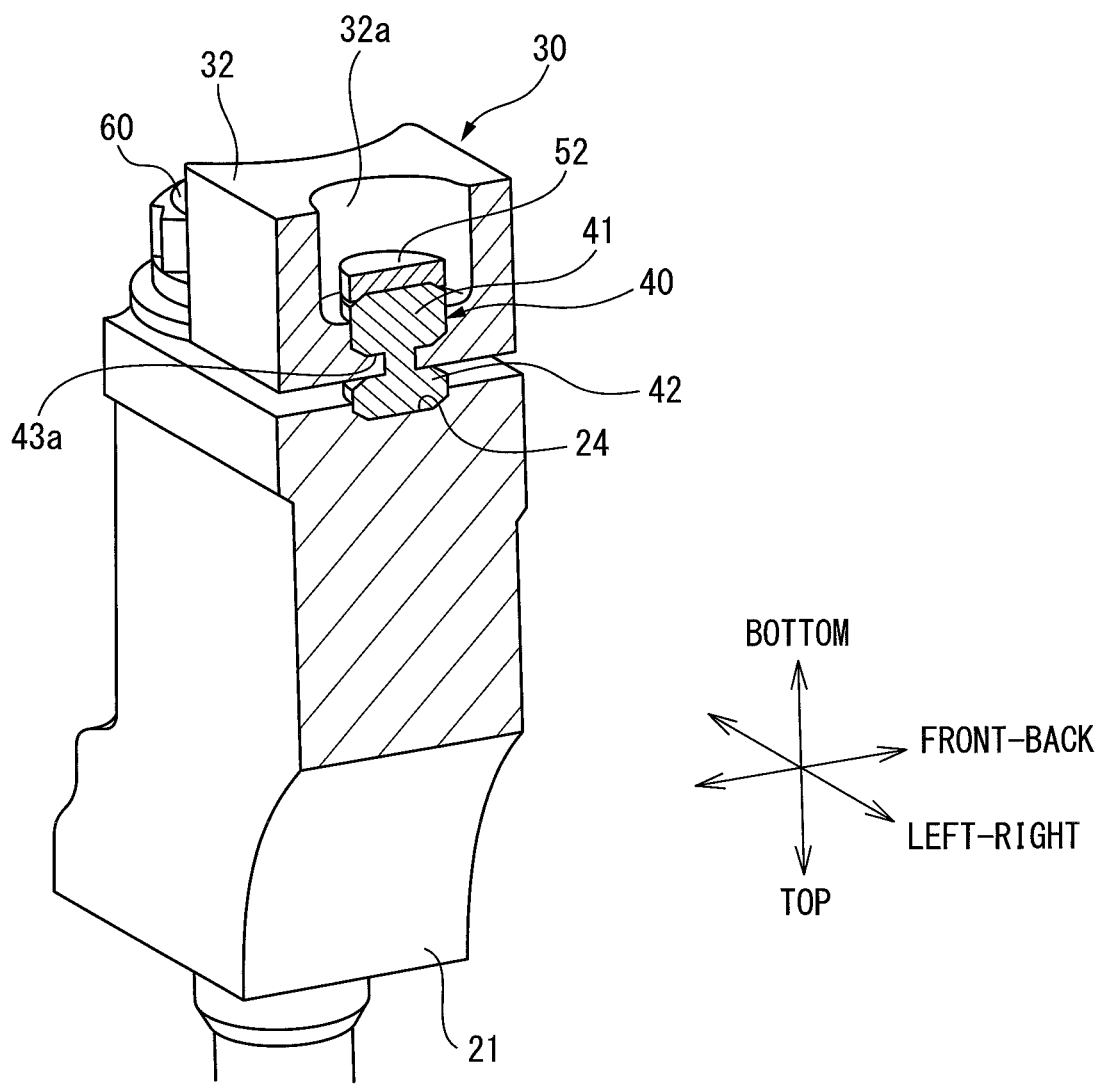
FIG. 5 is a cross-sectional perspective view of a crank cap assembly seen along a line V-V of FIG. 2.

FIG. 2 is a perspective view schematically showing the crank cap assembly 10 in the assembled state. FIG. 3 is a cross-sectional perspective view of the crank cap assembly 10 seen along the line of FIG. 2. FIGS. 4 and 5 are cross-sectional perspective views of the crank cap assembly 10 seen along the line IV-IV and the line V-V of FIG. 2, respectively.

As shown in FIGS. 1 to 5, in this Description, for convenience, the axial direction of the crankshaft 5 will be referred to as the "front-back direction", while the mounting direction when attaching a crank cap 20 of the crank cap assembly 10 to the cylinder block 2 will be referred to as the "top-bottom direction". In particular, in the "top-bottom direction", the side where the cylinder block 2 is relatively positioned will be referred to as the "top side", while the side where the crank cap assembly 10 is relatively positioned is referred to as the "bottom side". Further, the direction perpendicular to these "front-back direction" and "top-bottom direction" will be referred to as the "left-right direction". Note that the above "front-back direction", "top-bottom direction", and "left-right direction" do not necessarily specify directions in which the internal combustion engine is set. Therefore, depending on the mounting state of the internal combustion engine with respect to the vehicle, for example, the "front-back direction" may mean the vertical direction of the vehicle. Note that FIGS. 2 to 5 are drawn turned upside down with respect to FIG. 1.

As shown in FIGS. 2 to 5, in the present embodiment, each crank cap assembly 10 is provided with a single crank cap 20, a mass member 30, elastic rubber members 40, a fastening member 50, and two cap bolts 60.

The crank cap 20 is formed by a metal material, and rotatably supports the crankshaft 5. The crank cap 20 is attached to the cylinder block 2 in a state extending in the left-right direction. Therefore, the left-right direction can be referred to as the "direction of extension of the crank cap". The crank cap 20 is provided with a semicircular shaped recess 21 for supporting a crank journal 5b of the crankshaft 5, cap through holes 22 for receiving cap bolts 60, a mounting bolt hole 23 for holding a mounting bolt 56, and fitting grooves 24 for partially holding the second rubber parts 42 of the elastic rubber members 40.

The recess 21 is formed at the top of the crank cap 20 so as to be aligned with a recess of the cylinder block 2 when the crank cap 20 is attached to the cylinder block 2. On the inside surface of the recess 21, a semicylindrical shaped journal bearing is provided. The cap through holes 22 are formed so as to extend in the top-bottom direction at the left and right ends of the crank cap 20.

The mounting bolt hole 23 is formed so as to extend from the bottom surface of the crank cap 20 in the upward direction. Further, the mounting bolt hole 23 in the present embodiment is arranged at the center of the crank cap 20 in the left-right direction and front-back direction. Note that, in the present embodiment, only one mounting bolt hole 23 is provided at the crank cap 20, but a plurality of the mounting bolt holes may also be provided. Further, the mounting bolt hole 23 may also be provided at a position offset from the center of the crank cap 20 in the left-right direction.

The fitting grooves 24 are formed at the bottom surface of the crank cap 20. In particular, in the present embodiment, the crank cap 20 is provided with two fitting grooves 24. These fitting grooves 24 are provided at positions at equal intervals from the center of the crank cap 20 to the two sides in the left-right direction. The fitting grooves 24 have shapes complementary with the cross-sectional shapes of the second rubber parts 42 (explained later) of the elastic rubber members 40. Note that the crank cap 20 need not be provided with fitting grooves 24.

Figure 6:
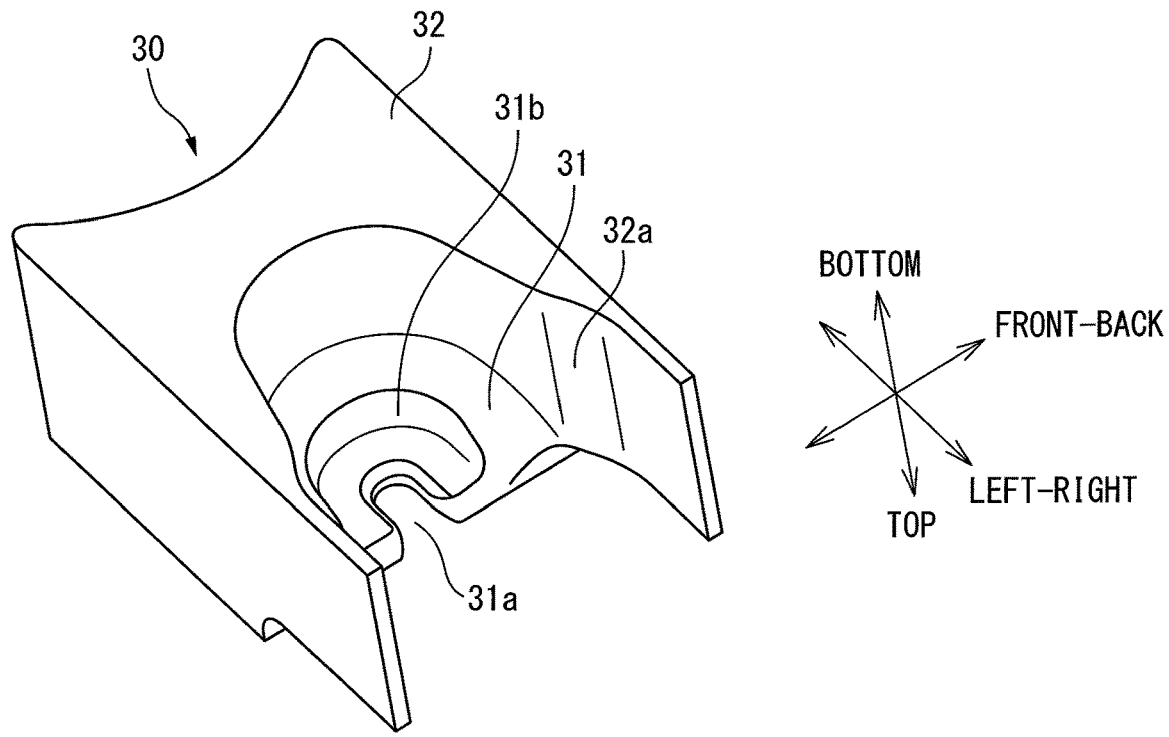
FIG. 6 is a schematic cross-sectional perspective view of mass member seen along the line IV-IV of FIG. 2.

FIG. 6 is a schematic cross-sectional perspective view of the mass member 30 seen along the line IV-IV of FIG. 2. In the present embodiment, the mass member 30 has a symmetrical shape about the cross-section perpendicular to the left-right direction.

The mass member 30 is, for example, formed by a metal material, and is elastically attached to the crank cap 20 by the elastic rubber members 40. As shown in FIGS. 3 to 5, the mass member 30 is provided with plate shaped parts 31 sandwiched between the elastic rubber members 40 and supported by the elastic rubber members 40, and a weight 32 provided around the plate shaped part 31. In the present embodiment, the mass member 30 is formed so that the length in the front-back direction is equal to or less than the length of the crank cap 20 in the front-back direction and so that the length in the left-right direction is equal to or less than the length of the crank cap 20 in the left-right direction.

The weight 32 is configured so as to have an opening 32a at the center in the front-back direction and the left-right direction. The two plate shaped parts 31 are provided in the opening 32a separated in the left-right direction. The opening 32a is formed so as to pass between the two plate shaped parts 31 in the top-bottom direction. In particular, in the present embodiment, the plate shaped parts 31 are provided in the opening 33 so as to be substantially flush with the top surface of the weight 32. Viewed conversely, the mass member 30 is formed so that the weight 32 extends from the plate shaped parts 31 in the perpendicular direction in only one direction. In particular, the weight 32 is connected with the plate shaped parts 31 so that when the crank cap assembly 10 is assembled, it extends from the plate shaped parts 31 in the top-bottom direction in a direction away from the crank cap 20.

The plate shaped parts 31 are provided with openings 31a extending from the center sides to the outer sides of the plate shaped parts 31 in the left-right direction. Further, at the bottom surfaces of the plate shaped parts 31, recesses 31b are provided around the openings 31a. In the present embodiment, the recesses 31b have shapes similar to the openings 31a. In the present embodiment, the openings 31a of the plate shaped parts 31 are formed so as to receive connecting parts 43 (explained later) of the elastic rubber members 40. Further, at least parts of the plate shaped parts 31 are arranged between the first rubber parts 41 and the second rubber parts 42 (explained later) of the elastic rubber members 40.

Figure 7:
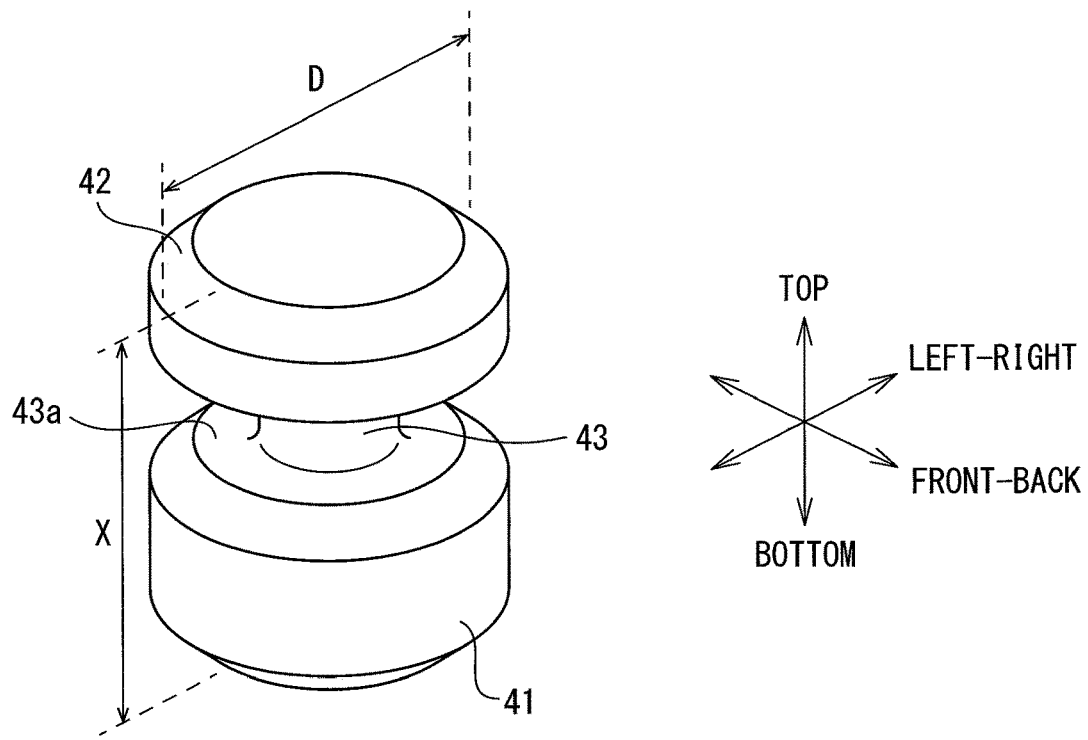
FIG. 7 is a perspective view of one elastic rubber member.

FIG. 7 is a perspective view of one elastic rubber member 40. The elastic rubber members 40 elastically attach the mass member 30 to the crank cap 20. The elastic rubber members 40 are formed by a rubber material with a high durability and small in deterioration even in an environment in which high temperature lubrication oil is present. Each elastic rubber member 40 is provided with a first rubber part 41, second rubber part 42, and connecting part 43. In the present embodiment, the first rubber part 41 and second rubber part 42 are formed in substantially columnar shapes having the same cross-sections. Further, in the present embodiment, the connecting part 43 is formed in a columnar shape smaller in diameter than the first rubber part 41 and second rubber part 42.

In each elastic rubber member 40 of the present embodiment, the connecting part 43 is connected between a first rubber part 41 and a second rubber part 42. These first rubber part 41, second rubber part 42, and connecting part 43 are integrally formed. In particular, in the present embodiment, the elastic rubber member 40 is formed so that the first rubber part 41, second rubber part 42, and connecting part 43 have the same axes. Further, the first rubber part 41, second rubber part 42, and connecting part 43 are arranged in line with each other in the top-bottom direction so as to extend in the top-bottom direction.

As shown in FIGS. 3 and 5, the first rubber part 41 is arranged between a fastening member 50 and the mass member 30. Specifically, the first rubber part 41 is arranged between a supporting part 52 of the fastening member 50 (explained later) and a plate shaped part 31 of the mass member 30.

In the present embodiment, the first rubber part 41 is attached so as to fit a fitting groove 52a (explained later) of the fastening member 50. Due to this, the first rubber part 41 is kept from moving with respect to the fastening member 50 in the front-back direction and the left-right direction. Note that if the fastening member 50 is not provided with fitting grooves 52a, the first rubber part 41 of the elastic rubber member 40 is, for example, fastened by being bonded to the fastening member 50.

Further, part of the first rubber part 41 is received in a recess 31b of a plate shaped part 31. In particular, the side surface of the first rubber part 41 at the opposite side from the center side of the mass member 30 in the left-right direction is formed in a shape complementary to the side wall of the recess 31b of the plate shaped part 31. As a result, part of the side surface of the first rubber part 41 contacts the side wall of the recess 31b of the mass member 30. Therefore, in the present embodiment, the elastic rubber member 40 can be said to be arranged so that part of the side surface of the first rubber part 41 contacts the mass member 30.

The second rubber part 42 is arranged between the crank cap 20 and the mass member 30. Specifically, the second rubber part 42 is arranged between the bottom surface of the crank cap 20 and a plate shaped part 31 of the mass member 30. In particular, in the present embodiment, the top surfaces of the plate shaped parts 31 are formed flat. The second rubber part 42 is arranged so that the flat top surface of the plate shaped part 31 and the bottom surface of the second rubber part 42 contact each other.

In the present embodiment, the second rubber part 42 is attached so as to fit a fitting groove 24 of the crank cap 20. Due to this, the second rubber part 42 is kept from moving in the front-back direction and the left-right direction with respect to the crank cap 20. Note that if the crank cap 20 is not provided with the fitting grooves 24, the second rubber part 42 of the elastic rubber member 40 is, for example, fastened by being bonded to the crank cap 20.

The connecting part 43 is configured so that the first rubber part 41 is connected to the second rubber part 42 and the elastic rubber member 40 is integral. As explained above, the connecting part 43 is configured to be smaller in diameter than the first rubber part 41 and second rubber part 42, and have the same axis, therefore a circumferential groove 43a extending over the entire circumferential direction is formed around the connecting part 43.

In this circumferential groove 43a, a plate shaped part 31 of the mass member 30 is fit. At this time, the connecting part 43 is held in the opening 31a of the plate shaped part 31. Therefore, the connecting part 43 is formed to be smaller than the opening 31a in the cross-section perpendicular to the top-bottom direction. In this way, as a result of the plate shaped part 31 being fitted in the circumferential groove 43a, part of the plate shaped part 31 is arranged between the first rubber part 41 and the second rubber part 42 of the elastic rubber member 40.

As explained above, in the present embodiment, the elastic rubber member 40 is integrally formed. In addition, the elastic rubber member 40 is attached to the mass member 30 by fitting a plate shaped part 31 of the mass member 30 in the circumferential groove 43a. As a result, it is easy to assemble the crank cap 20.

The elastic rubber member 40 configured as above is formed so that the length in the mounting direction (X in FIG. 7) is longer than the maximum length in the cross-section of the elastic rubber member perpendicular to the mounting direction. In the present embodiment, the elastic rubber member 40 is formed so that the length X in the mounting direction is greater than the diameters of the first rubber part 41 and second rubber part 42.

Further, in the present embodiment, two elastic rubber members 40 are arranged at the two sides from the center of the crank cap 20 in the left-right direction. In particular, in the present embodiment, two elastic rubber members 40 are arranged at positions at equal intervals from the center of the crank cap 20 to the two sides in the left-right direction. By two elastic rubber members 40 being arranged in such a way, the balance in the left-right direction of the crank cap 20 is kept from deteriorating.

Figure 8A:
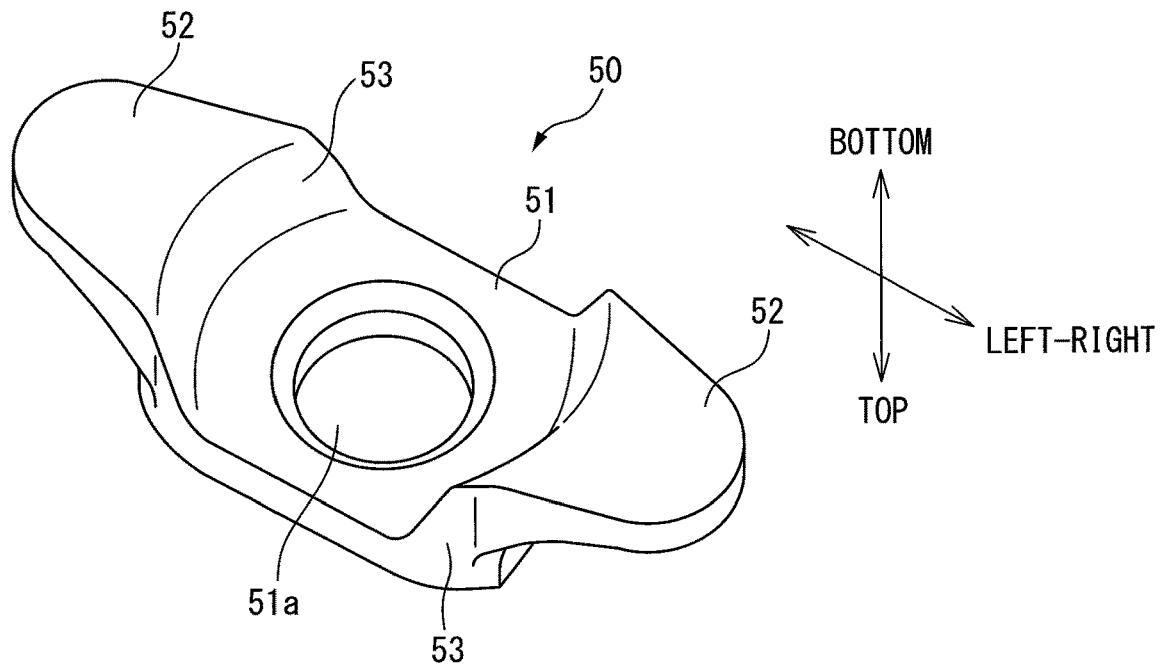
FIGS. 8A and 8B are perspective views of a fastening member.
Figure 8B:
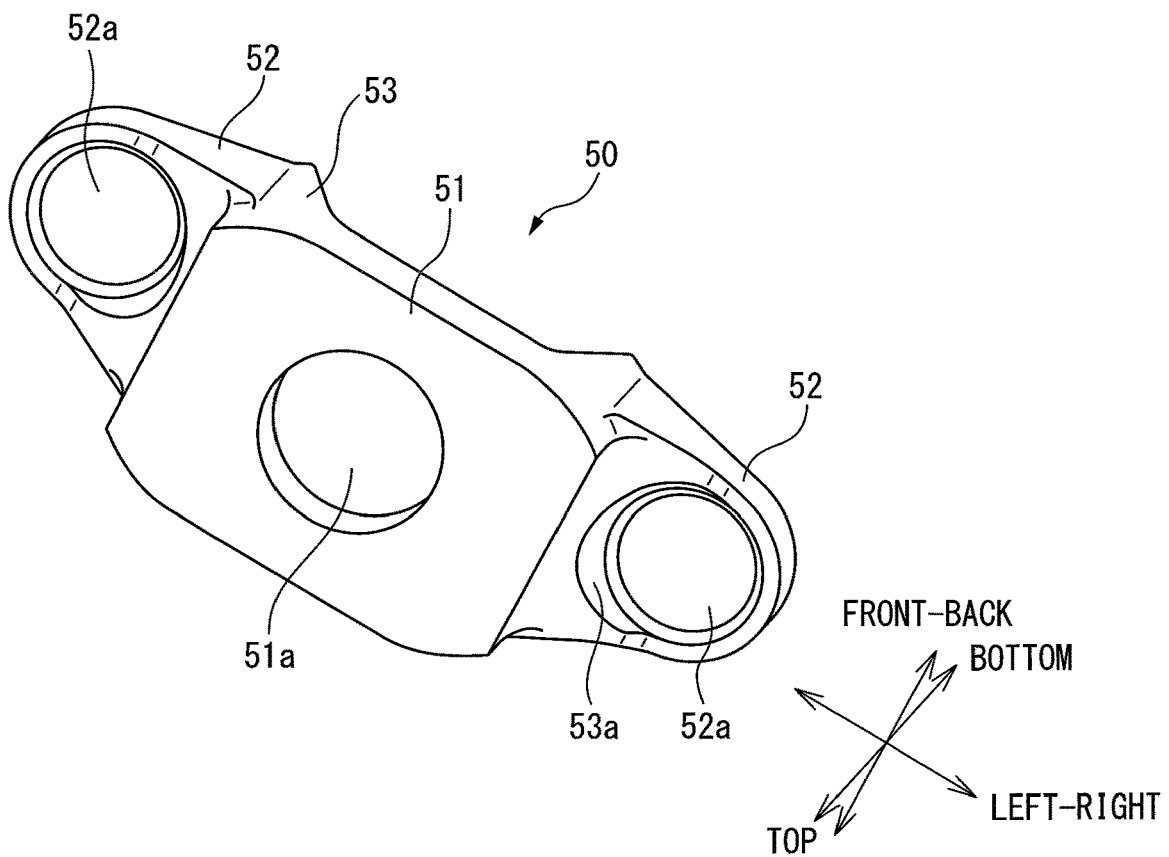

FIGS. 8A and 8B are perspective views of a fastening member 50. FIG. 8A is a perspective view showing the fastening member 50 from below, while FIG. 8B is a perspective view showing the fastening member 50 from above. The fastening member 50, for example, is formed by a metal material, is fastened to the crank cap 20, and supports the elastic rubber members 40.

The fastening member 50 is provided with a mounting part 51 attached to the crank cap 20 by a mounting bolt 56, two supporting parts 52 supporting the elastic rubber members 40, and connecting parts 53 extending between the mounting part 51 and the supporting parts 52. In the present embodiment, the fastening member 50 has a symmetrical shape with respect to the cross-section perpendicular to the left-right direction.

The mounting part 51 is formed in a flat plate shape and is provided with a through hole 51a extending through the mounting part 51. In the present embodiment, the through hole 51a is provided at the center of the fastening member 50 in the left-right direction.

The mounting part 51 is arranged so that its top surface contacts the bottom surface of the crank cap 20. Further, the mounting part 51 is arranged so that the through hole 51a is aligned with the mounting bolt hole 23 of the crank cap 20. The mounting bolt 56 is inserted through the through hole 51a of the mounting part 51. By the mounting bolt 56, the mounting part 51 and in turn the fastening member 50 are fastened to the crank cap 20. In particular, in the present embodiment, the mounting bolt hole 23 is arranged at the center of the crank cap 20 in the left-right direction, therefore the mounting part 51 is also arranged at the center of the crank cap 20 in the left-right direction. Therefore, the fastening member 50 is arranged so that the center in the left-right direction thereof coincides with the center of the crank cap 20 in the left-right direction.

The supporting parts 52 are arranged at the two sides of the mounting part 51 in the left-right direction. Therefore, the mounting part 51 is arranged in the middle of the two supporting parts 52 in the left-right direction. According to the present embodiment, by adopting such a configuration, a single fastening member 50 can be used to support and fasten two elastic rubber members 40.

The supporting parts 52 respectively support single elastic rubber members 40. In particular, in the present embodiment, the mounting part 51 of the fastening member 50 is fastened by the mounting bolt 56 to the crank cap 20 so that the supporting parts 52 compress the first rubber part 41 and second rubber part 42 of the elastic rubber member 40 in the top-bottom direction. Therefore, the supporting parts 52 compress the first rubber part 41 and second rubber part 42 in the top-bottom direction and, in that state, fasten the elastic rubber members 40 so as to keep them from moving with respect to the crank cap 20.

At the top surfaces of the supporting parts 52, fitting grooves 52a partially holding the first rubber parts 41 of the elastic rubber members 40 are provided. In particular, the fitting grooves 52a of the supporting parts 52 have shapes complementary with the cross-sectional shapes of the first rubber parts 41. Note that, the supporting parts 52 need not be provided with the fitting grooves 52a. Whatever the case, the supporting parts 52 contact the first rubber parts 41 of the corresponding elastic rubber members 40 to support the first rubber parts 41.

Further, the fastening member 50 of the present embodiment is configured so that the supporting parts 52 are positioned below the mounting part 51. In other words, the fastening member 50 is formed so that the supporting parts 52 are positioned further separated from the crank cap 20 in the top-bottom direction than the mounting part 51. As a result, as shown in FIGS. 2 and 3, the bottom surface of the head of the mounting bolt 56 is arranged at a position of substantially the same extent as the bottom surfaces of the supporting parts 52 in the top-bottom direction. Due to this, the bottom surface of the head of the mounting bolt 56 is kept from being positioned below the bottom surfaces of the supporting parts 52 so as to protrude downward from the mass member 30. As a result, the total length of the top-bottom direction of the crank cap assembly 10 is kept from being long.

The connecting parts 53 connect the mounting part 51 and the supporting parts 52, which are offset in the top-bottom direction. Therefore, the connecting parts 53 are arranged so as to extend in the top-bottom direction. Further, the connecting parts 53 are provided at the two sides of the mounting part 51 in the left-right direction, and connect the mounting part 51 and single supporting parts 52, respectively.

The connecting parts 53 have circular contact surfaces 53a at the outer circumferential surfaces facing the first rubber parts 41 of the elastic rubber members 40. The circular contact surfaces 53a have shapes complementary with the outer circumferential surfaces of the facing first rubber parts 41 and contact the first rubber parts 41 of the elastic rubber members 40. More specifically, the contact surfaces 53a, as shown in FIG. 3, contact the side surfaces of the first rubber parts 41 at the opposite sides to the side surfaces of the first rubber parts 41 contacting the mass member 30.

The two cap bolts 60 fasten the crank cap 20 to the internal combustion engine 1, specifically, the cylinder block 2. The cap bolts 60 are arranged to extend in the top-bottom direction at the two end parts of the crank cap 20 in the left-right direction.

<<Elastic Support of Mass Member>>

In this regard, in the crank cap assembly 10 configured as explained above, the mass member 30 is elastically supported by the elastic rubber members 40 with respect to the crank cap 20. Specifically, the mass member 30 is elastically supported by elastic force in the compression direction of the elastic rubber members 40 in the top-bottom direction.

Here, the spring constant when supporting the mass member 30 in the top-bottom direction with respect to the crank cap 20 changes in accordance with the modulus of longitudinal elasticity and cross-sectional area of the elastic rubber members 40. The modulus of longitudinal elasticity of the elastic rubber members 40 changes in accordance with the material of these elastic rubber members 40 and the fastening force of the mounting bolt 56. Therefore, the spring constant in the top-bottom direction changes in accordance with the cross-sectional area and material of these elastic rubber members 40 and the fastening force of the mounting bolt 56, etc.

On the other hand, the mass member 30 is elastically supported by the elastic force in the shear direction or bending direction of the elastic rubber members 40 in the front-back direction and the left-right direction. Here, the spring constant when supporting the mass member 30 with respect to the crank cap 20 in the front-back direction and the left-right direction changes in accordance with the modulus of transverse elasticity and cross-sectional shape (distribution of shear stress accompanying cross-sectional shape) of the elastic rubber members 40. Further, the modulus of transverse elasticity of the elastic rubber members 40 also changes according to the material of the elastic rubber members 40 or fastening force of the mounting bolt 56. Therefore, the spring constant in the front-back direction and the left-right direction changes in accordance with the material or cross-sectional shape of the elastic rubber members 40, fastening force of the mounting bolt 56, etc.

In addition, in the present embodiment, the mass member 30 is elastically supported in the left-right direction by the elastic force in the compression direction of the elastic rubber members 40. Here, in the above embodiment, the elastic rubber members 40 are arranged so that parts of the side surfaces of the first rubber parts 41 contact the mass member 30. Further, the elastic rubber members 40 contact the fastening member 50 at the side surfaces at the opposite sides from the side surfaces contacting the mass member 30. As a result, when the mass member 30 vibrates in the left-right direction, the elastic rubber members 40 receive the compressive force in the left-right direction. For this reason, the elastic rubber members 40 are elasticity supported in the left-right direction by the elastic force in the compression direction of the elastic rubber members 40. Therefore, the spring constant when supporting the mass member 30 with respect to the crank cap 20 in the left-right direction changes in accordance with the modulus of longitudinal elasticity of the elastic rubber members 40.

Note that in the above embodiment, the recesses 31b are formed at only the bottom surfaces of the plate shaped parts 31 of the mass member 30. However, the recesses may also be formed at the top surfaces of the plate shaped parts 31 of the mass member 30 or only at the top surfaces. In this case, parts of the side surfaces of the second rubber parts 42 contact the side walls of the recesses formed on the top surfaces of the plate shaped parts 31. Therefore, according to the present embodiment, the elastic rubber members 40 can be said to be arranged so that at least one of the first rubber parts 41 or second rubber parts 42 contact the mass member 30 at least at parts of the side surfaces thereof.

In the present embodiment, the elastic rubber members 40 are set in spring constant in the top-bottom direction, the spring constant in the front-back direction, and the spring constant in the left-right direction in accordance with the resonant vibration generated at the crank cap 20. Specifically, the spring constant in the front-back direction is set so that the resonant frequency of the mass member 30 in the front-back direction is the same in extent as the resonant frequency in the resonant vibration of the crank cap 20 in the front-back direction. Further, the spring constant in the left-right direction is configured so that the resonant frequency of the mass member 30 in the left-right direction is the same in extent as the resonant frequency at the resonant vibration of the crank cap 20 in the left-right direction. In addition, the spring constant in the top-bottom direction is configured so that the resonant frequency of the mass member 30 in the top-bottom direction is the same in extent as the resonant frequency at the resonant vibration of the crank cap 20 in the top-bottom direction.

Advantageous Effects

Figure 9A:
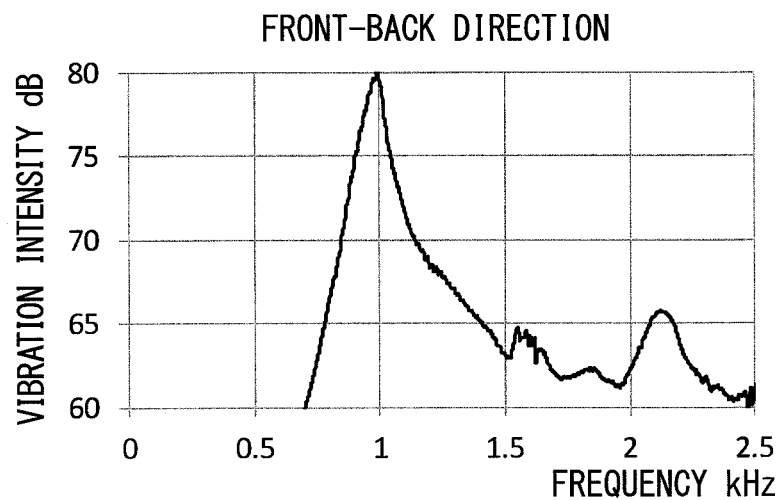
FIGS. 9A-9C are views showing the intensity for each frequency of vibration occurring at a crank cap when the internal combustion engine is operated.
Figure 9B:
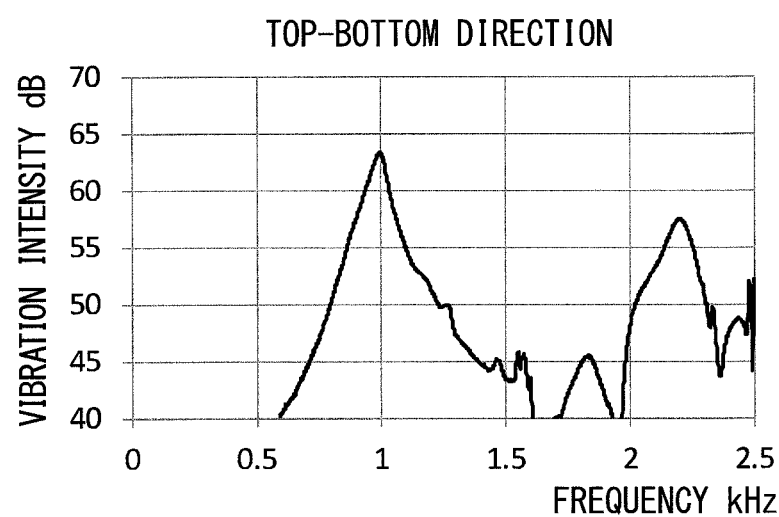
Figure 9C:
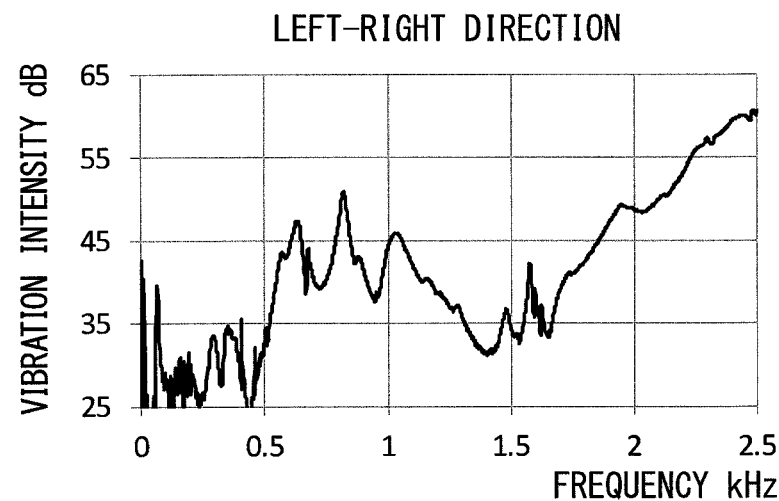

Referring to FIGS. 9A-9C, the advantageous effect obtained by the crank cap assembly 10 according to the above embodiment will be explained. FIGS. 9A-9C are views showing the intensity for each frequency of vibration occurring at the crank cap 20 when the internal combustion engine 1 is operated. FIGS. 9A, 9B, and 9C show the intensities of vibration generated in the front-back direction, top-bottom direction, and left-right direction of the crank cap 20, respectively.

In the internal combustion engine used in the experiment shown in FIGS. 9A-9C, as shown in FIG. 9A, in the front-back direction, vibration of about 1 kHz is the largest. Further, in such an internal combustion engine, as shown in FIG. 9B, in the top-bottom direction, vibrations of about 1 kHz and about 2.2 kHz are the largest. In addition, in such an internal combustion engine, as shown in FIG. 9C, in the left-right direction, vibration of about 0.8 kHz is large. The frequency where vibration is larger in each direction differs according to the model of the internal combustion engine, but these frequencies will not significantly differ among different models of internal combustion engines.

As will be understood from FIGS. 9A-9C, in these vibration intensities, the intensity of the vibration in the front-back direction of about a frequency of 1 kHz is the greatest. Therefore, to reduce the noise of the internal combustion engine 1, it is necessary to reduce the vibration in the front-back direction of about a frequency of 1 kHz.

Here, for example, flat plate shaped rubber members may conceivably be provided, as elastic spring members, between the crank cap 20 and the mass member 30. However, in this case, if forming the rubber members by a material with a large modulus of elasticity, the resonant frequency of the mass member 30 in the front-back direction becomes much larger than about 1 kHz. On the other hand, if forming the rubber members by a material with a small modulus of elasticity, the resonant frequency of the mass member 30 in the front-back direction can be made 1 kHz or so. In this regard, however, in this case, the resonant frequency of the mass member 30 in the top-bottom direction becomes too low, and therefore even if the cross-sectional area of the rubber material is adjusted, it is difficult to make the resonant frequency in the top-bottom direction 1 kHz or so.

As opposed to this, according to the above embodiment, the elastic rubber members 40 are formed so that the length (X in FIG. 7) in the mounting direction is longer than the maximum length in the cross-section of the elastic rubber members perpendicular to the mounting direction. Therefore, the elastic rubber members 40 are formed not in flat plate shapes, but so as to be elongated in the top-bottom direction. As a result, even if the elastic rubber members 40 are not formed by a material with a small modulus of elasticity, it is possible to make the spring constant in the front-back direction a relatively low value, and therefore the mass member 30 can be given a resonant frequency of 1 kHz or so in the front-back direction. Therefore, according to the crank cap assembly 10 according to the above embodiment, it is possible to reduce the vibration of the crank cap 20 in the front-back direction.

In addition, the elastic rubber members 40 are formed by a material with a relatively large modulus of elasticity. For this reason, the resonant frequency of the mass member 30 in the top-bottom direction is kept from becoming too low. As a result, the vibration of the crank cap 20 in the top-bottom direction can also be suitably reduced.

Furthermore, regarding vibration in the left-right direction as well, it is possible to adjust the contact area of the mass member 30 or fastening member 50 to the side surfaces of the first rubber parts 41 of the elastic rubber members 40, or adjust the cross-sectional shape of the elastic rubber members 40 to thereby adjust the spring constant of the elastic rubber members 40 in the left-right direction. Due to this, it is possible to suitably reduce vibration of the crank cap 20 in the left-right direction.

<<Modifications of First Embodiment>>

Next, referring to FIGS. 10 to 14, modifications of the first embodiment will be explained.

Figure 10A:
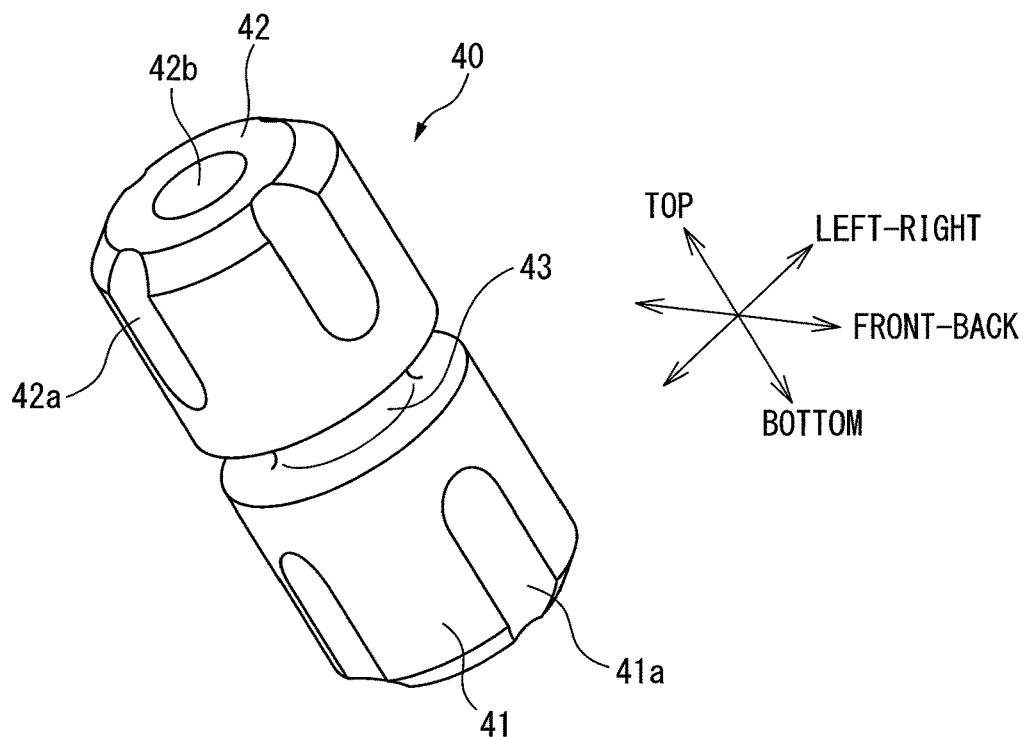
FIGS. 10A and 10B are perspective views showing an elastic rubber member according to a first modification.
Figure 10B:
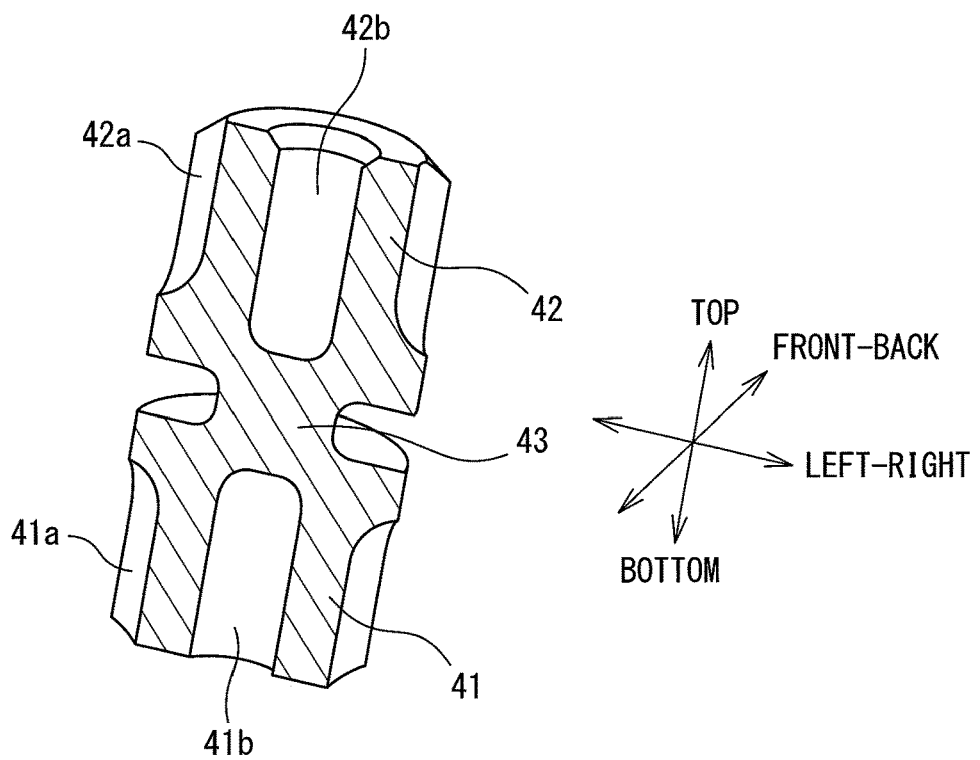

FIGS. 10A and 10B are perspective views showing an elastic rubber member 40 according to a first modification. As shown in FIGS. 10A and 10B, the elastic rubber member 40 according to the present modification is provided with a plurality of longitudinal grooves 41a, 42a extending in the top-bottom direction on the side surfaces of first rubber part 41 and second rubber part 42. In particular, in the present modification, the first rubber part 41 and second rubber part 42 are respectively provided with four longitudinal grooves 41a, 42a. Further, in the present modification, the longitudinal grooves 41a, 42a are arranged at equal angle intervals in the circumferential direction. Therefore, in the present modification, the elastic rubber member 40 is formed so that the cross-sectional shape thereof perpendicular to the top-bottom direction is a four-fold symmetric shape about an axis extending in the top-bottom direction of the elastic rubber member 40. In addition, in the present modification, the longitudinal grooves 41a of the first rubber part 41 are formed so as to extend from the bottom end of the first rubber part 41 toward the upward direction. Further, the longitudinal grooves 42a of the second rubber part 42 are formed so as to extend from the top end of the second rubber part 42 toward the downward direction.

In addition, the elastic rubber member 40 according to the present modification is provided with center holes 41b, 42b extending in the top-bottom direction at the centers of the first rubber part 41 and second rubber part 42. Therefore, the first rubber part 41 and second rubber part 42 are formed in tubular shapes. Further, in the present modification, the center hole 41b of the first rubber part 41 is formed so as to extend from the bottom end of the first rubber part 41 toward the upward direction. Further, the center hole 42b of the second rubber part 42 is formed so as to extend from the top end of the second rubber part 42 toward the downward direction.

Note that, in the first modification, the first rubber part 41 and second rubber part 42 are both provided with longitudinal grooves and center holes. However, only one of the first rubber part 41 and second rubber part 42 may be provided with the longitudinal grooves, and only one of them may be provided with a center hole. Further, the center holes 41b, 42b may also extend over the entire first rubber part 41 and second rubber part 42 in the top-bottom direction, and may extend over only parts thereof. Further, in the above first modification, the first rubber part 41 and second rubber part 42 were respectively provided with four longitudinal grooves, but the elastic rubber member 40 may have any other numbers of grooves so long as forming a four-fold symmetrical shape.

Here, the spring constant in the top-bottom direction of the elastic rubber member 40 mainly changes according to the elastic force in the compression direction. Therefore, the spring constant in the top-bottom direction changes according to the cross-sectional areas of the first rubber part 41 and the second rubber part 42. On the other hand, the spring constants of the elastic rubber member 40 in the left-right direction and front-back direction change according to the elastic force in the shearing direction or bending direction. Therefore, the spring constants in the left-right direction and front-back direction change according to the cross-sectional secondary moments of the first rubber part 41 and second rubber part 42. According to the present modification, the first rubber part 41 and second rubber part 42 are provided with longitudinal grooves 41a, 42a and center holes 41b, 42b, therefore by suitably adjusting their sizes, it becomes possible to set the spring constant in the top-bottom direction and the spring constants in the left-right direction and front-back direction to suitable values.

Figure 11:
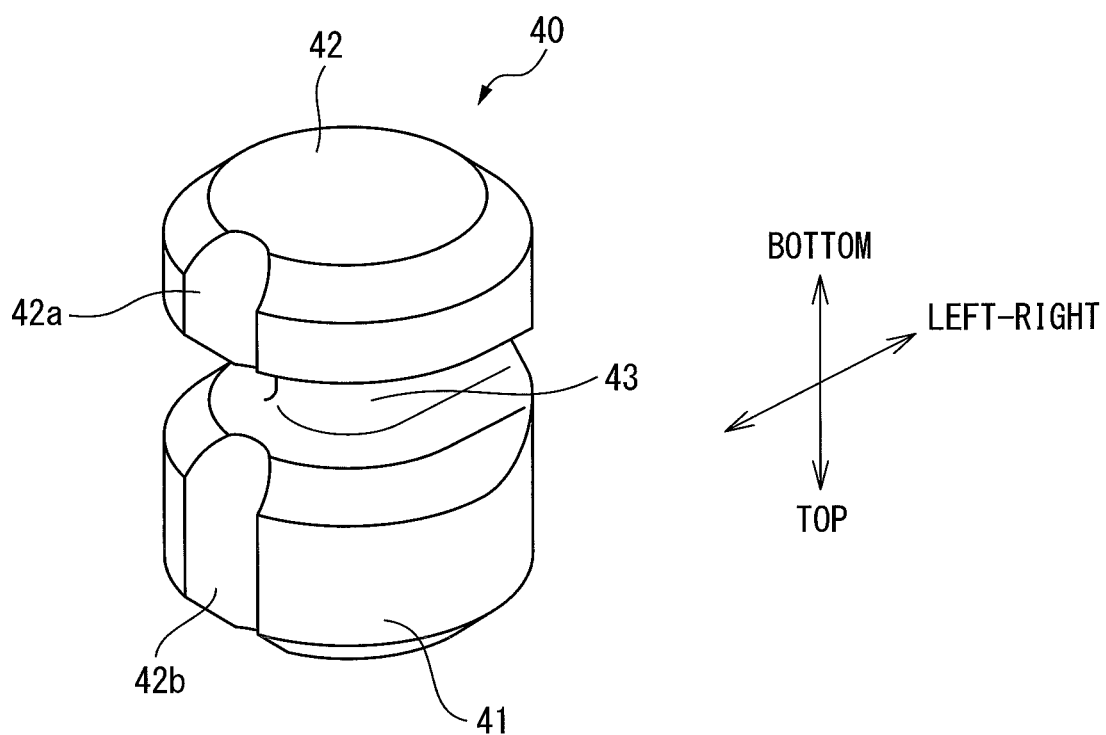
FIG. 11 is a perspective view showing an elastic rubber member according to a second modification.
Figure 12:
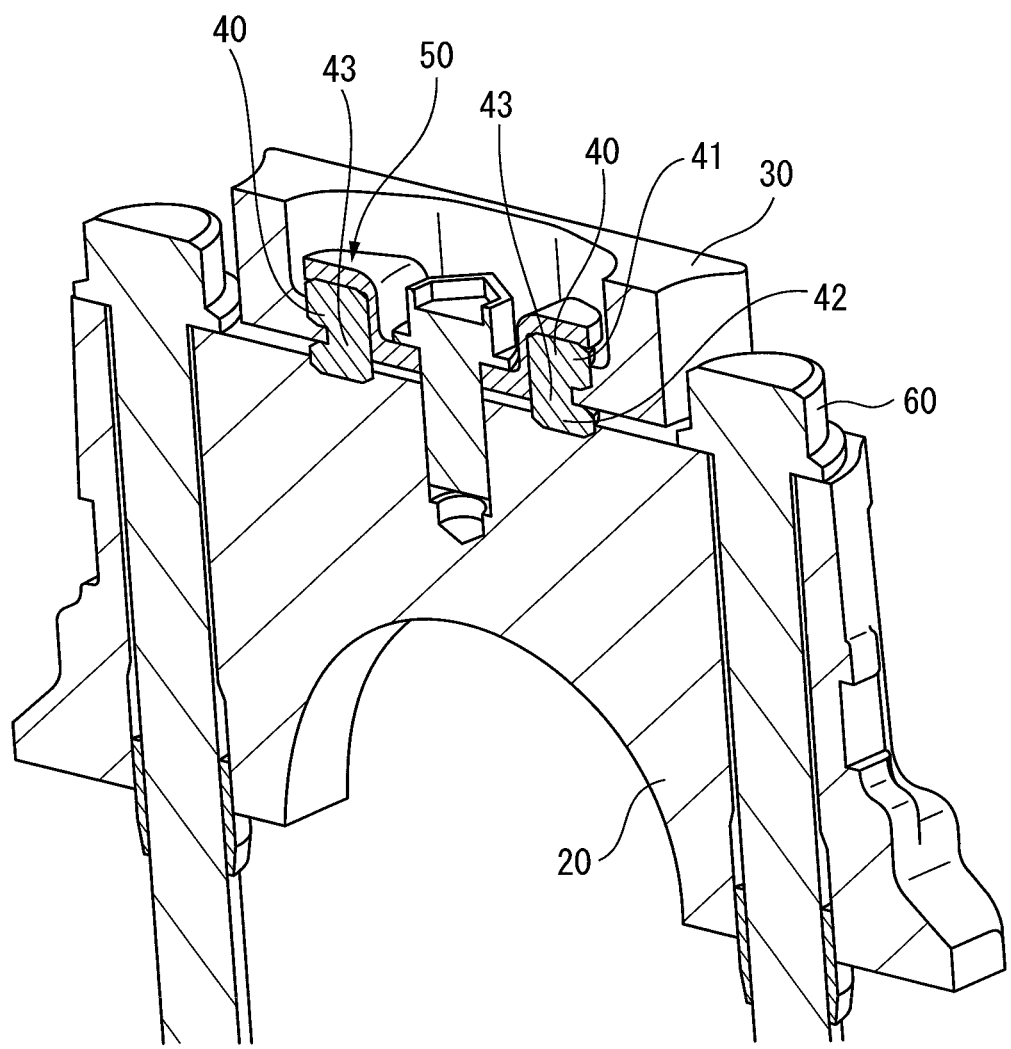
FIG. 12 is a cross-sectional perspective view, similar to FIG. 3, of a crank cap assembly in which an elastic rubber member according to a second modification is used.
Figure 12:
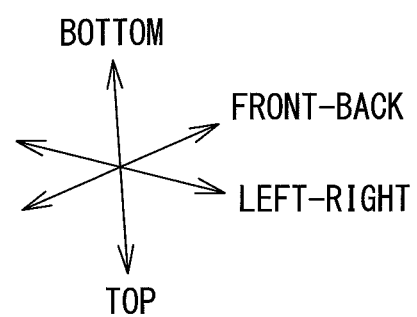

FIG. 11 is a perspective view showing an elastic rubber member 40 according to a second modification. FIG. 12 is a cross-sectional perspective view, similar to FIG. 3, of a crank cap assembly 10 in which elastic rubber members 40 according to the present modification are used. As shown in FIG. 11, the elastic rubber member 40 according to the present modification is comprised of a first rubber part 41 and second rubber part 42 on the side surfaces of which single longitudinal grooves 41a, 42a are provided. In particular, in the present modification, the longitudinal grooves 41a, 42a are arranged at the left side or right side of the elastic rubber member 40. Therefore, in the present modification, the elastic rubber member 40 is formed so that the cross-sectional shape perpendicular to the top-bottom direction is a four-fold asymmetric shape about the axis extending in the top-bottom direction of the elastic rubber member 40.

Here, as explained above, the spring constants of the left-right direction and front-back direction change corresponding to the cross-sectional secondary moments of the first rubber part 41 and second rubber part 42. Therefore, since the first rubber part 41 and second rubber part 42 are formed into a four-fold asymmetric shape, the cross-sectional secondary moments differ between the left-right direction and front-back direction. For this reason, according to the present modification, by suitably adjusting the sizes of the longitudinal grooves 41a, 42a, etc., it is possible to separately adjust the spring constant in the left-right direction and in the front-back direction.

Further, in the present modification, the connecting part 43 is formed not in a circular columnar shape, but a polygonal columnar shape having two parallel side surfaces 43b extending in parallel. The side surfaces of the connecting part 43 extending in parallel extend in the left-right direction. Further, one side surface 43c between these two parallel side surfaces 43b (see FIGS. 13A and 13B) is formed so as to be flush with the side surfaces of the first rubber part 41 and second rubber part 42. Therefore, in the present modification, the circumferential groove 43a does not extend over the entire periphery around the connecting part 43, but extends over part of it. Further, the other of the side surfaces between the two parallel side surfaces is formed so as to have a semicircular shaped cross-section.

Here, as shown in FIG. 6, the opening 31a of a plate shaped part 31 of the mass member 30 is provided with a part with a side wall defining the opening 31a extending in parallel. Therefore, the plate shaped part 31 is formed so as to have a shape complementary with the parallel side surfaces 43b of the connecting part 43. Due to this, as shown in FIG. 12, the elastic rubber member 40 can be positioned at a fixed position with respect to the mass member 30 in the circumferential direction.

Figure 13A:
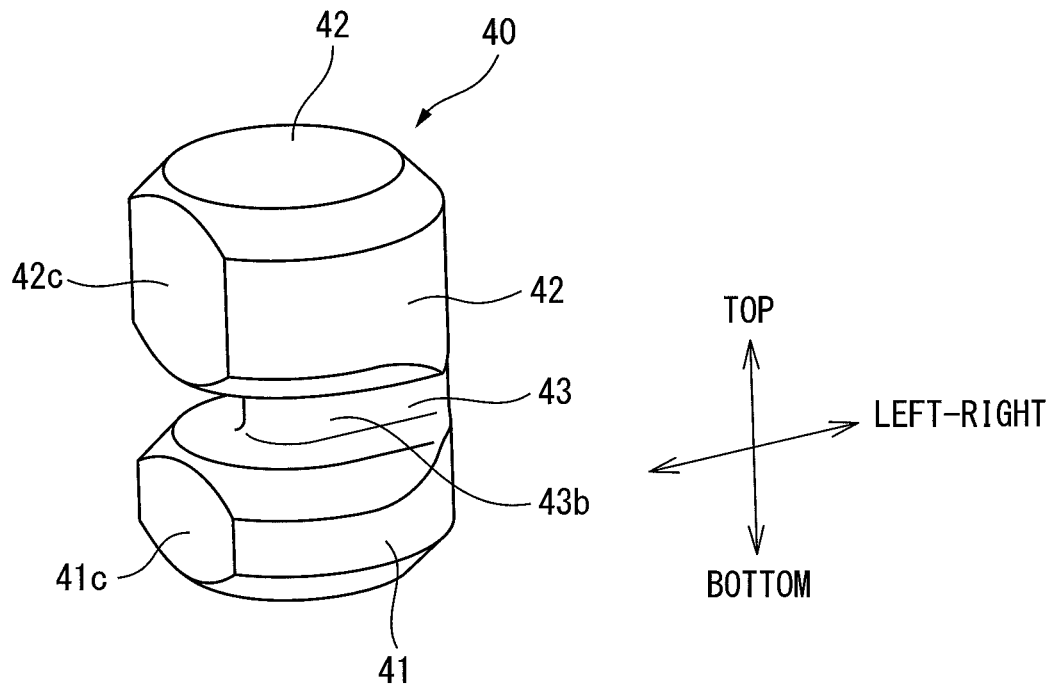
FIGS. 13A and 13B are perspective views showing an elastic rubber member according to a third modification.
Figure 13B:
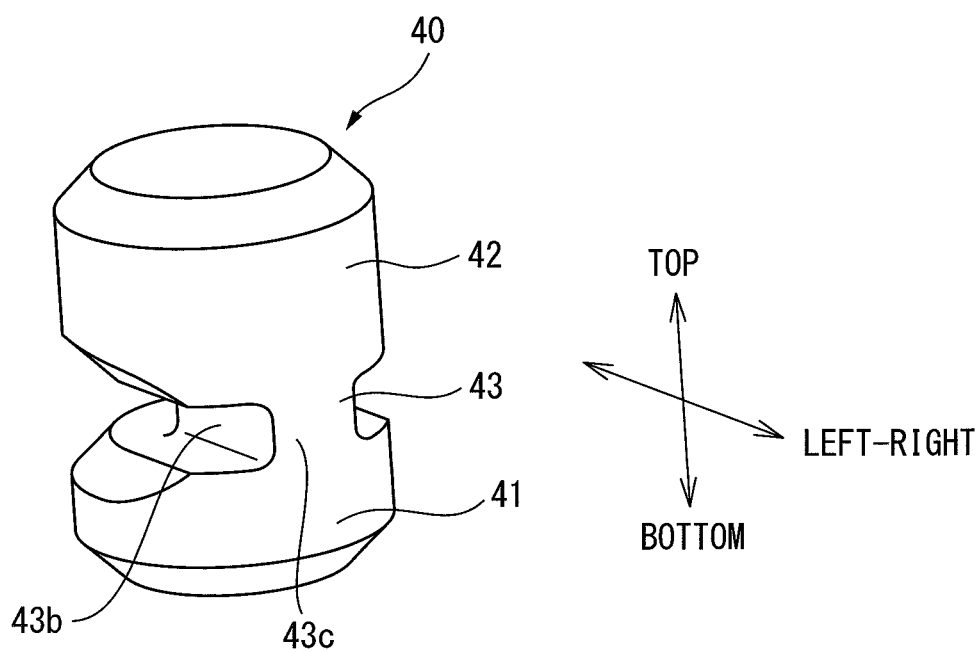

FIGS. 13A and 13B are perspective views showing an elastic rubber member 40 according to a third modification. FIG. 13A is a perspective view showing the elastic rubber member 40 from a certain angle, while FIG. 13B is a perspective view showing the elastic rubber member 40 rotated 90 degrees from FIG. 13A.

As shown in FIGS. 13A and 13B, in the elastic rubber member 40 according to the third modification, instead of the longitudinal grooves, cutaway parts 42c are provided. Therefore, the first rubber part 41 and second rubber part 42 are shaped with parts of columnar shapes cut at flat cross-sections.

Figure 14A:
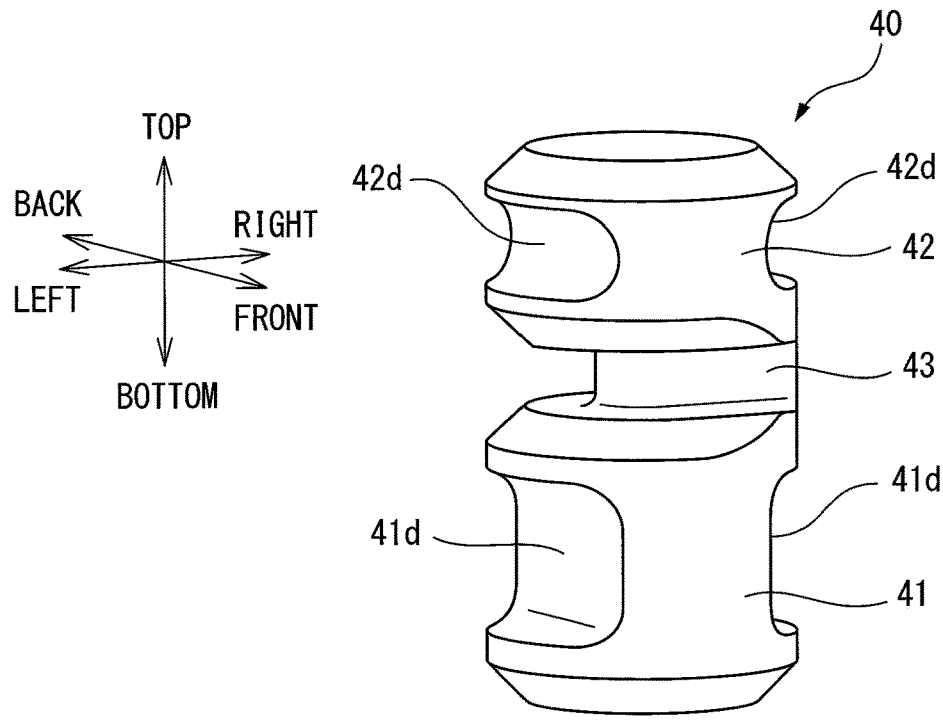
FIGS. 14A and 14B are perspective views showing an elastic rubber member according to a fourth modification.
Figure 14B:
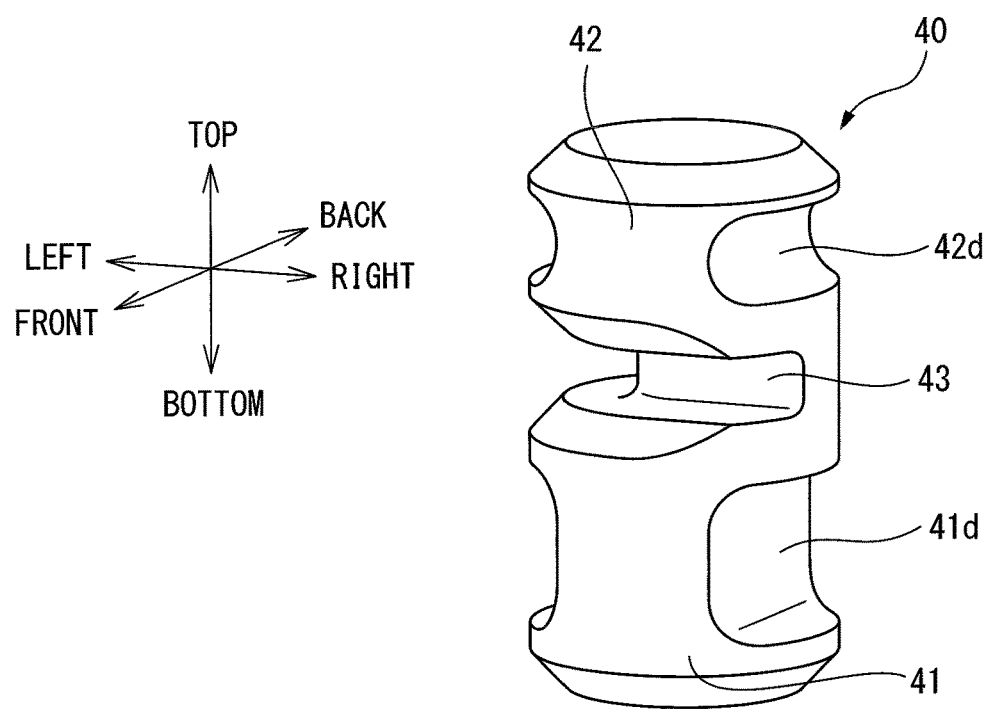

FIGS. 14A and 14B are perspective views showing an elastic rubber member 40 according to a fourth modification. FIG. 14A is a perspective view showing the elastic rubber member 40 from a certain angle, while FIG. 14B is a perspective view showing the elastic rubber member 40 rotated 90 degrees from FIG. 14A.

As shown in FIGS. 14A and 14B, the elastic rubber member 40 according to the fourth embodiment is provided on the side surfaces of the first rubber part 41 and second rubber part 42 with pluralities of transverse grooves 41d, 42d extending in the front-back direction instead of longitudinal grooves. In particular, in the present modification, the first rubber part 41 and second rubber part 42 are respectively provided with two transverse grooves 41d, 42d. However, the first rubber part 41 and the second rubber part 42 may respectively have any numbers of transverse grooves other than two. Further, the first rubber part 41 and the second rubber part 42 may have transverse grooves extending in the left-right direction or other direction different from the front-back direction.

Further, in the above embodiment, the first rubber part 41 and second rubber part 42 of the elastic rubber member 40 are formed integrally with the connecting part 43. However, the first rubber part 41 and the second rubber part 42 may also be formed as separate members. In this case as well, the first rubber part 41 and the second rubber part 42 are arranged aligned in the top-bottom direction. Further, in this case, the plate shaped parts 31 need not have the openings 31a. Further, in this case, each plate shaped part 31 may have recesses 31b of shapes complementary with the first rubber part 41 and second rubber part 42 at both of the top surface and bottom surface.

Second Embodiment

Figure 15:
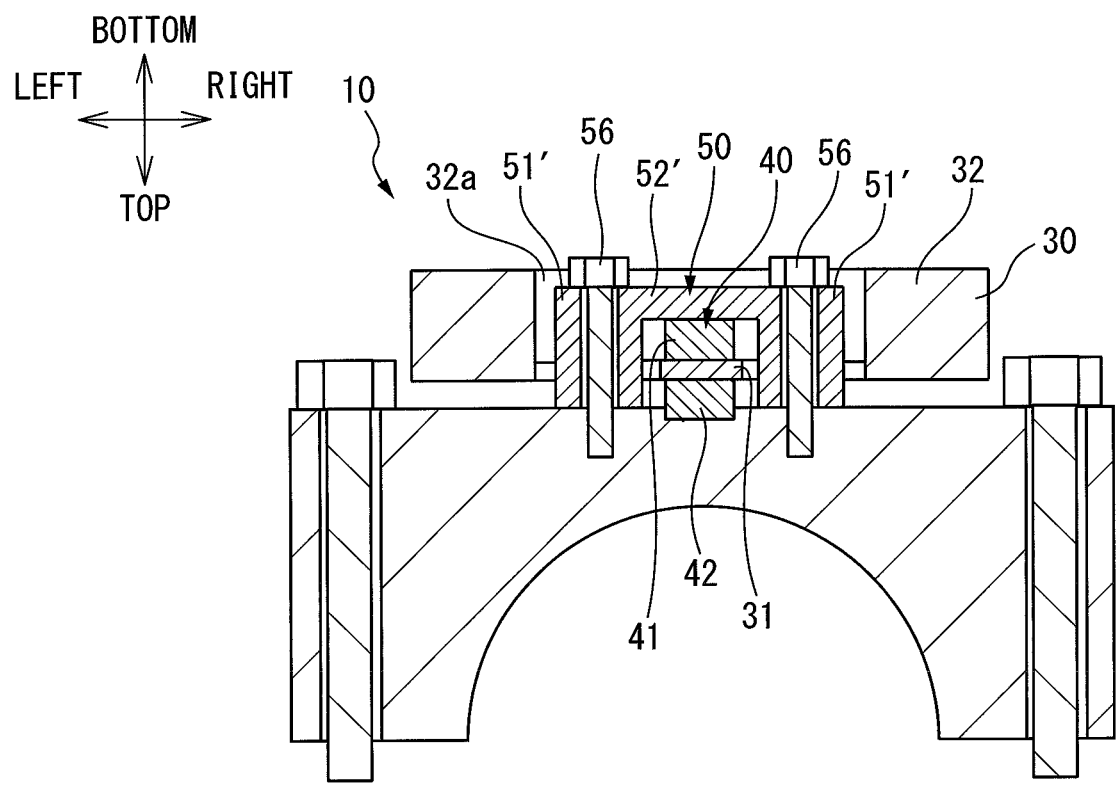
FIG. 15 is a cross-sectional side view showing a cross-section of a crank cap assembly according to a second embodiment, similar to the cross-section seen from the line of FIG. 2.

Next, referring to FIG. 15, a crank cap assembly 10 according to a second embodiment will be explained. Below, parts different from the first embodiment will be focused on to explain the second embodiment. FIG. 15 is a cross-sectional side view, similar to the cross-section seen from the line of FIG. 2, showing the cross-section of the crank cap assembly 10 according to the second embodiment.

As will be understood from FIG. 15, the mass member 30 is provided with a single plate shaped part 31 and a weight 32. The plate shaped part 31 is formed in the opening 32a of the weight 32 at the center. The plate shaped part 31 is not provided with an opening, but is formed in a plate shape. Further, in the left-right direction of the plate shaped part 31, openings are provided between the plate shaped part 31 and the weight 32.

The elastic rubber member 40 is provided with a first rubber part 41 and a second rubber part 42. Between the first rubber part 41 and the second rubber part 42, no connecting part is provided. The first rubber part 41 and the second rubber part 42 are formed as separate members. The first rubber part 41 and the second rubber part 42 are arranged in the top-bottom direction of the plate shaped part 31 so as to straddle the plate shaped part 31 between them.

The fastening member 50 is provided with two mounting parts 51' and a single supporting part 52'. In the present embodiment, the mounting parts 51' are formed so as to extend longer than the elastic rubber member 40 in the top-bottom direction. The supporting part 52' is arranged between the two mounting parts 51' in the left-right direction and is attached to the bottom end parts of the two mounting parts 51'.

The fastening member 50 is arranged so that the supporting part 52' is positioned at the center of the crank cap 20 in the left-right direction. As a result, the elastic rubber member 40 is positioned at the center of the crank cap 20 in the left-right direction. Therefore, the elastic rubber member 40 supports the mass member 30 at the center of the crank cap 20 in the left-right direction.

According to the present embodiment, since the crank cap assembly 10 is configured in this way, the mass member 30 is supported at one point by the elastic rubber member 40 in the left-right direction. For this reason, the mass member 30 has greater elastic support in the bending direction as well in the left-right direction. Therefore, it is possible to effectively reduce the vibration in the case of bending vibration of the crank cap 20 in the left-right direction.

While preferred embodiments according to the present invention and their modifications are explained above, the present invention is not limited to these embodiments, and various modifications and changes can be made within the scope of the language of the claims.

The invention claimed is:

1. A crank cap assembly comprising a single crank cap rotatably supporting a crankshaft, wherein
   the crank cap is attached to an engine body in a mounting direction,
   the crank cap assembly comprises a fastening member fastened to the crank cap, a mass member, and an elastic rubber member elastically attaching the mass member to the crank cap,
   the elastic rubber member includes a first rubber part arranged between the fastening member and the mass member and a second rubber part arranged between the crank cap and the mass member,
   the first rubber part and the second rubber part are arranged to be aligned in the mounting direction when attaching the crank cap to the engine body, and
   a length of the elastic rubber member in the mounting direction is longer than a maximum length of a cross-section of the elastic rubber member in a direction perpendicular to the mounting direction.

2. The crank cap assembly according to claim 1, wherein the elastic rubber member is formed as an integral member in which the first rubber part and the second rubber part are connected by a connecting part, and includes a circumferential groove extending at least partially in the circumferential direction at the connecting part, and
   the mass member is configured to include a plate shaped part fit in the circumferential groove.

3. The crank cap assembly according to claim 2, wherein the mass member further includes a weight provided at the circumference of the plate shaped part, and
   the connecting part has two parallel side surfaces extending in parallel and the plate shaped part of the mass member includes an opening of a shape complementary with the parallel side surfaces of the connecting part.

4. The crank cap assembly according to claim 1, wherein the crank cap assembly includes two elastic rubber members, and
   the elastic rubber members are arranged at positions at equal intervals from the center of the crank cap to the two sides in the direction of extension of the cap, which is perpendicular to the axial direction of the crankshaft and the mounting direction.

5. The crank cap assembly according to claim 4, wherein the fastening member includes a single mounting part attached to the crank cap and two supporting parts respectively supporting single first rubber parts, and
   the mounting part is arranged at the middle of the two supporting parts in the direction of extension of the cap.

6. The crank cap assembly according to claim 1, wherein the crank cap assembly includes one elastic rubber member, and
   the elastic rubber member is arranged at the center of the crank cap in the direction of extension of the cap, which is perpendicular to the axial direction of the crankshaft and the mounting direction.

7. The crank cap assembly according to claim 1, wherein in the elastic rubber member, at least one of the first rubber part or the second rubber part includes a groove extending in the mounting direction or in the direction perpendicular to the mounting direction, on the side surface thereof.

8. The crank cap assembly according to claim 1, wherein the elastic rubber member is arranged so that at least one of the first rubber part or the second rubber part contacts the mass member on at least part of the side surface of the first rubber part or the second rubber part.

9. The crank cap assembly according to claim 8, wherein the fastening member is formed so as to contact a side surface of the first rubber part at the opposite side to the side surface of the first rubber part contacting the mass member.

10. The crank cap assembly according to claim 1, wherein at least one of the first rubber part and the second rubber part is formed at least partially in a tubular shape.

11. The crank cap assembly according to claim 1, wherein the first rubber part and the second rubber part are formed so that the cross-sectional shapes perpendicular to the mounting direction are four-fold asymmetrical shapes.

12. The crank cap assembly according to claim 1, wherein the fastening member includes at its surface a fitting groove having a complementary shape with the cross-sectional shape of the first rubber part, and the first rubber part is attached to the fastening member so as to fit in the fitting groove provided at the fastening member.

13. The crank cap assembly according to claim 1, wherein the crank cap includes at its surface a fitting groove having a complementary shape with the cross-sectional shape of the second rubber part, and the second rubber part is attached to the crank cap so as to fit in the fitting groove provided at the crank cap.

14. The crank cap assembly according to claim 1, wherein the fastening member includes a mounting part attached to the crank cap and a supporting part contacting the first rubber part and supporting the first rubber part, and
   the fastening member is formed so that the supporting part is positioned away from the crank cap in the mounting direction compared with the mounting part.

15. The crank cap assembly according to claim 1, wherein the mass member includes a plate shaped part including a part arranged between the first rubber part and the second rubber part, and a weight provided around the plate shaped part, and
   the weight is connected with the plate-shaped part so as to extend in a direction away from the crank cap in the mounting direction from the plate shaped part.

* * * * *